United States Patent [19]

Tomita et al.

[11] Patent Number: 5,417,995
[45] Date of Patent: May 23, 1995

[54] SPREAD AND A METHOD FOR PRODUCTION OF SAID SPREAD

[75] Inventors: Mamoru Tomita; Kazuyoshi Sotoyama; Ryo Kato; Yuzo Asano; Kiyotaka Takahashi, all of Kanagawa, Japan

[73] Assignee: Morinaga Milk Industry Co., Ltd., Tokyo, Japan

[21] Appl. No.: 953,883

[22] Filed: Sep. 30, 1992

[30] Foreign Application Priority Data

Apr. 6, 1992 [JP] Japan .................. 4-084086

[51] Int. Cl.$^6$ ................................ A23D 7/00
[52] U.S. Cl. .................. 426/330.6; 426/603
[58] Field of Search ........... 426/663, 603, 602, 330.6

[56] References Cited

U.S. PATENT DOCUMENTS

| | | | |
|---|---|---|---|
| 4,305,970 | 12/1981 | Moran | 426/603 |
| 4,366,180 | 12/1982 | Altrock | 426/602 |
| 4,388,339 | 6/1983 | Lomneth | 426/603 |
| 4,555,411 | 11/1985 | Moran | 426/603 |
| 4,888,197 | 12/1989 | Wieske | 426/603 |
| 4,957,758 | 9/1990 | Drijftholt | 426/330.6 |
| 5,089,139 | 2/1992 | Asbeck | 426/330.6 |
| 5,223,300 | 6/1993 | Brinkers | 426/603 |
| 5,279,847 | 1/1994 | Okonogi | 426/603 |

FOREIGN PATENT DOCUMENTS 2095433 4/1990 Japan .

*Primary Examiner*—Carolyn Paden
*Attorney, Agent, or Firm*—Wenderoth, Lind & Ponack

[57] ABSTRACT

The present invention provides a method for production of a spread, comprising the steps of:

(a) two aqueous phases with different particle sizes in a fatty phase, of which at least one aqueous phase is dispersed into the fatty phase through a microporous membrane, to prepare a mixed water-in-oil type emulsion;

(b) rapidly cooling the emulsion to plasticize; and (c) kneading the plasticized emulsion.

According to the present invention, it is possible to produce a low-fat spread having good taste easily, which does not require a stabilizer or a gelling agent, is excellent in stability and preservativity on a level never achieved by any conventional methods.

9 Claims, 2 Drawing Sheets

SPREAD AND A METHOD FOR PRODUCTION OF SAID SPREAD

FIELD OF THE INVENTION

The present invention relates to a spread which is a low-fat emulsified food product, and a method for production of said spread. More particularly, the present invention relates to a spread excellent in stability and preservativity, consisting primarily of plastic fats and oils, an aqueous solution and emulsifying agents, using no specified fats and oils and emulsifying agents, and a method for producing such a spread suitable for mass production.

DESCRIPTION OF RELATED ART

A spread is a water-in-oil type (hereinafter simply referred to as "W/O type") emulsified state where less oils and fats and more water are contained than in ordinary margarine. However, such a low fat W/O type emulsion contains much water, and hence it is very difficult to provide a stable W/O type emulsion frequently resulting in unstable emulsions. For this reason, the aqueous phase can be separated during the storage, or the spread may be subjected to phase inversion during a production process or in transit, substantially reducing its value as a product.

Accordingly various techniques have been conventionally developed to maintain the stability of a W/O type spread with a high water content. Most of these techniques relate to the improvement of the constitution or composition of the spread itself with virtually few technological improvements offered as to the method of emulsification. Most emulsification methods are by the normal methods (for instance, stirring by a homomixer, ultrasonic methods, etc.). There have been essentially few technological developments intended to associate the stabilization of a W/O type spread with high water content with emulsification procedures, except for the technology already proposed by us in U.S. patent application Ser. No. 07/683,182, now issued as U.S. Pat. No. 5,279,847.

Known improvements concerning the constitution or make-up of W/O type spreads are, for example, a method for causing specific amounts of di-glyceride, tri-glyceride and lecithin to be contained in fatty phase components, or the one for causing specific amounts of protein or polysaccharides as stabilizer (or gelling agents) to be contained in aqueous phase components or the one adding specific amounts of specific emulsifying agents.

However, of these conventional methods, the method of specifying fatty phase components have drawbacks in that inter esterifications are required to provide a di-glyceride and tri-glyceride, and the constituents of the product are limited. And, in the case where protein or polysaccharides is added for stabilization, the taste is adversely affected and fungi or germs are apt to grow.

Furthermore, in the case of adding a specific type of emulsifying agent in a specific amount, it is difficult to achieve sufficient stability of emulsion. So, technologies have been proposed which have somewhat succeeded in improving the emulsification stability by simultaneous use of polyglycerin ester of condensed ricinoleic acid and other emulsifying agents (Japanese Patent Provisional Publications No. 70.432/83, No. 198,243/83, No. 130.526/84, No. 143,637/87), but the ester having unique odor and taste is likely to impair the flavor of the product. In this regard, a method (Japanese Patent Provisional Publication No. 1,200,248/90) teaches a use of another specific emulsifying agent such as, for example, polyglycerin ester of condensed 12-hydroxystearic acid to improve the flavor of the product. However, if the type and composition of emulsifying agent are limited as by this method, the physical properties, taste and flavor of the product are restricted.

We therefore carried out extensive studies to obtain a stabe low-fat spread, which is not limited in the components and kinds of fats and oils and emulsifying agents, never requires stabilizers or gelling agents, and which generates no leaks or phase inversions, and found following facts. That is, it is essential for producing the low-fat spread to select a particularly stable emulsion for the rapid cooling and kneading processes, and a procedure for obtaining such emulsion is an improved membrane emulsification. Based upon these findings we had completed a novel low-fat spread and a method for producing it, and filed a U.S. patent application (patent application Ser. No. 07/683,182 now issued as U.S. Pat. No. 5,279,847: hereinafter referred to as "the prior invention").

Even in such excellent method of the prior invention, however, a few points to be improved were found in the production processes on an industrial scale. Namely, in the case of mass-producing a spread by the method according to the prior invention, particularly a low-fat product having a ratio of fatty phase of 20 to 50% (by weight: the same applies also hereafter) under conditions where a total content of stabilizer and gelling agent in aqueous phase is 15% and less, the stability and preservativity of the product are insufficient, and therefore, this method would not be practical for the transit processes of the product and preservation conditions thereof. In addition, in the method of the prior invention, a W/O type emulsion for the spread is usually prepared by dispersing an aqueous phase into a fatty phase through a microporous membrane. However, this procedure requires a long period of time to complete the emulsification.

SUMMARY OF THE INVENTION

An object of the present invention is to provide a low-fat spread, which is excellent in stability and preservativity, and appropriate to the mass production on an industrial scale, together with a method for producing such spread.

The present invention provides a method for production of a spread, comprising the steps of: (a) emulsifying two aqueous phases with different particle sizes in a fatty phase, of which at least one aqueous phase is emulsified into the fatty phase through a microporous membrane, to prepare a mixed water-in-oil type emulsion; (b) rapidly cooling the emulsion to plasticize; and (c) kneading the plasticized emulsion. And the present invention also provide a spread whenever produced by the method as described above.

Furthermore, in the method of the present invention, the mixed W/O type emulsion is preferred to be prepared by:

(1) dispersing an aqueous phase into a fatty phase through a microporous membrane to produce a W/O type emulsion, adding another aqueous phase different particle size from the former aqueous phase into the fatty phase of the W/O type emulsion, and emulsifying them by, for example, a stirrer;

(2) adding an aqueous phase into a fatty phase, emulsifying the mixture by, for example, a stirrer to produce a W/O type emulsion and dispersing another aqueous phase into the fatty phase of the W/O type emulsion through a microporous membrane;

(3) dispersing an aqueous phase into a fatty phase through a microporous membrane to produce a W/O type emulsion and dispersing another aqueous phase into the fatty phase of the W/o type emulsion through a microporous membrane with a pore diameter different from that of said membrane;

(4) dispersing an aqueous phase into a fatty phase through a microporous membrane to prepare a W/O type emulsion, and mixing it with a separately prepared W/O type emulsion by, for example, a stirrer; or (5) adding an aqueous phase to a continuously circulating fatty phase and emulsifying them by, for example, a stirrer while dispersing another aqueous phase into the fatty phase through a microporous membrane.

DETAILED DESCRIPTION OF THE INVENTION

This production method is featured by rapidly cooling, and kneading without phase inversion, a mixed W/O type emulsion having two aqueous phases in a fatty phase, and consisting primarily of plastic oils and fats, aqueous solution and emulsifying agent.

There are no limitations as to oils and fats comprising the fatty phase in a spread of the present invention in terms of constituents and types, except that they must be edible. For instance, they include rape seed oil, soybean oil, palm oil, palm kernel oil, corn oil, safflower oil, sunflower oil, cotton seed oil, coconut oil, milk fat, fish oil, beef oil, pork oil and other comprehensive kinds of animal and plant oils, and also processed oils and fats subjected to hydrogenation addition, inter esterification, fractionation and other treatments. They can be employed singularly or in combination. The ratio of the fatty phase constitutes 50% and less, especially 20 to 50% of the final product.

As the aqueous phases for the spread, water itself to which nothing is added can be employed, or substances obtained by dissolving and dispersing starch, process starch, protein, sugars, microorganism-derived polysaccharide, seasoning, salt, and milk products in water can be arbitrarily used. The concentration of the total amount of the stabilizer and gelling agent in the aqueous phases is between 0 and 15%.

To the kinds of the emulsifying agent constituting the spread of the present invention, no special limitations are imposed, except that they must be edible. They include sucrose esters of fatty acids, sorbitan esters of fatty acids, mono and di glycerides (including polyglycerin esters of fatty acids), polyglycerin ester of condensed ricinoleic acid, and polyglycerin esters of condensed 12-hydroxystearic acid. These materials can be used singularly or in combination at a ratio of 0.01 to 5.0% with regard to the spread.

The porous membrane with a micropore size used for the method of the present invention is publicly known, including an alumina ceramics membrane, a vitreous microporous membrane (produced by the method as described in Japanese Patent No. 1,518,989), and commercially available MPG (for MICROPOROUS GLASS; trademark; made by Ise Chemical Industry Co.[JAPAN]) membrane. These membranes can be produced to a given pore diameter ranging normally from 0.05 to 20 $\mu$m, and can be arbitrarily used depending on the emulsion to be obtained. In the present invention, it is not always necessary that the pore diameters be uniform.

The emulsification methods used for the present invention are any of the conventional one, including a stirring emulsification by a stirrer, a jet flow or a gas blowing, an atomizing emulsification, and an ultrasonic emulsification. In particularly, a stirrer used for the stirring emulsification is publicly known, including a homomixer or a homogenizer.

No special limitations are imposed on the rapid cooling and kneading units to be employed for the method according to the present invention. Any of the known rapid cooling and kneading units (votator, perfector, combinator and the like) can be used.

In the case of constructing a mixed W/O type emulsion with a membrane-emulsified W/O type emulsion and an otherwisely emulsified W/O type emulsion, the ratio of the membrane-emulsified W/O type emulsion constitutes 30% and more, especially 30 to 90% of the mixed W/O type emulsion.

Figure 1:
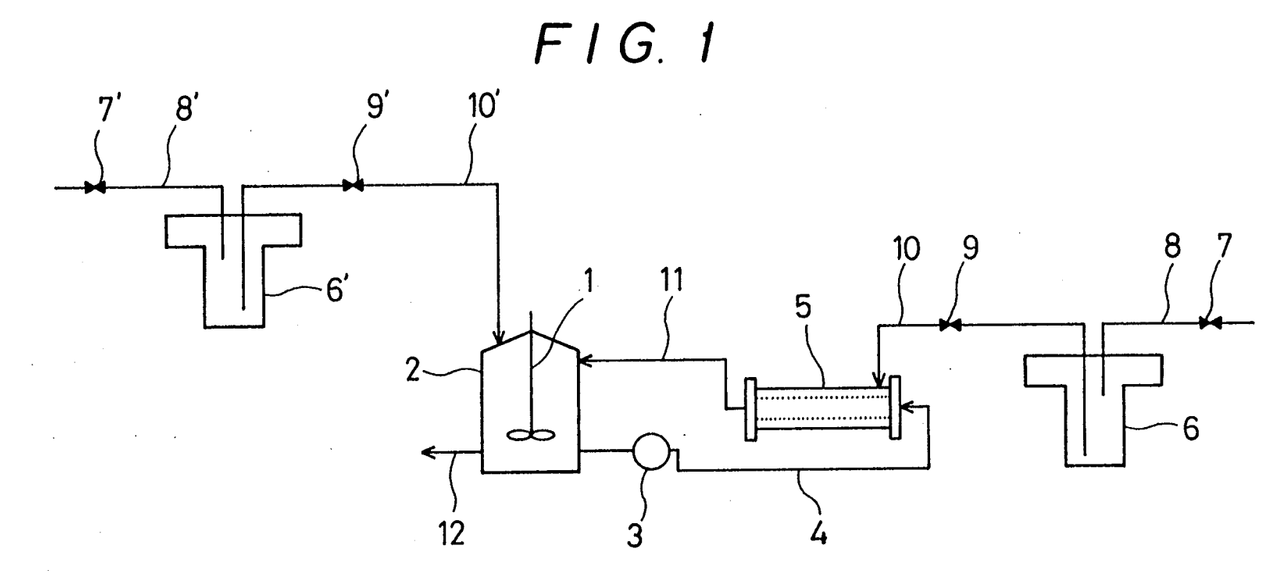
FIGS. 1 and 2 are schematic drawings of examples of the device to carry out the present invention.

Specific descriptions will now be given as to an example of production of a mixed W/O type emulsion while referring to the drawing attached (FIG. 1).

In a circulation bath (2) equipped with a stirrer (1), a given amount of a fatty phase is stored. The fatty phase is transferred with a pump (3) through a pipe line (4) to the center of a porous membrane module (5) equipped with a microporous membrane. In a pressure vessel (6), on the other hand, a given amount of an aqueous phase is stored. The aqueous phase is pressurized to a given pressure with inert gas adjusted with a valve (7) and introduced through a pipeline (8) or with a pressure pump, passed through a valve (9) and is fed through a pipeline (10) to the porous membrane module (5), and is dispersed into the fatty phase through micro pores of the microporous membrane to prepare a W/O type emulsion, i.e., a membrane-emulsified W/O type emulsion.

In this process for preparing the W/O type emulsion, the circulation flow rate inside the porous membrane module (5) of the fatty phase is 0.4 to 5 m/sec, and ordinarily can be arbitrarily selected within the range of 0.8 to 2 m/sec. The pressure of the aqueous phase is usually 0.001 to 30.0 kg/cm$^2$, and can be arbitrarily selected within the range in accordance with the kinds of aqueous solution to be used, particularly the kind and content of the stabilizers and gelling agents, the kind and quality of emulsifying agents, and emulsifying temperature. The temperatures of dispersion may be arbitrarily selected in the range of a room temperature to 80° C.

The thus prepared W/O type emulsion then returns through a pipeline (11) to the circulation bath (2), and at the same time, another aqueous phase is supplied to the circulation bath (2). This aqueous phase is stored in a pressure vessel (6'), and is pressurized to a given pressure with inert gas adjusted with a valve (7') and introduced through a pipeline (8') or with a pressure pump, passed through a valve (9') and is fed through a pipeline (10') to the circulation bath (2), and is added to the fatty phase of the W/O type emulsion, emulsified by the stirrer (1) to prepare a mixed W/O type emulsion.

The thus prepared mixed W/O type emulsion continuously circulates through the pipeline (4), the module (5), and the pipeline (11) to the circulation bath (2), and in these circulations, the membrane emulsification in the module (5) and stirring emulsification in the circulation bath (2) are repeated until substantially all the aqueous phases are emulsified in the fatty phase. After the completion of emulsifications, the emulsion is transferred through a pipeline (12) to subsequent process. The emulsion obtained may be pasteurized or sterilized by ordinary methods as necessary.

In the subsequent process, the emulsion thus obtained is rapidly cooled at a temperature of 5° to 20° C. and kneaded without phase inversion by a rapid cooling and kneading unit, to produce a W/O type spread.

In the process for preparing the mixed W/O type emulsion as illustrated in FIG. 1, any emulsification procedures, the membrane emulsification in the module (5) and the stirring emulsification in the bath (2), may be conducted first. The aqueous phases to be supplied for these emulsification procedures may have different or identical composition, and if identical, both aqueous phases may be supplied from the same container. The apparatus for suppling an aqueous phase to the bath (2) needs not necessarily be the pressure vessel (6'), and the aqueous phase may be supplied from an ordinary tank by means of a pump.

Figure 2:
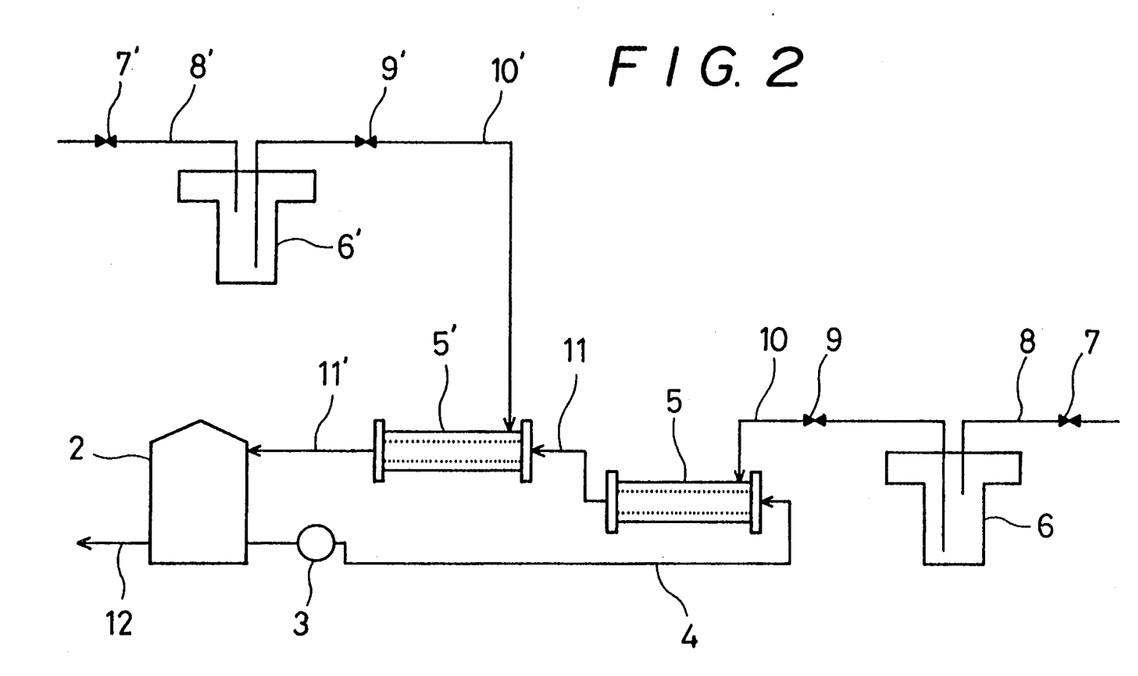

In the method of the present invention, furthermore, stirring emulsification with the stirrer (1) in the process as illustrated in FIG. 1 may be replaced by another emulsification method. As is shown in FIG. 2, a schematic representation of another process, for example, the present invention can be performed also by a construction combining two modules (5)(5') each equipped with a microporous membrane having different pore diameters. In this process, however, arrangement of the modules (5)(5') can be disregarded. In other words, it is not required to doubly connect the two modules in series, but they may be arranged in parallel, or in both sides of the circulation bath (2).

In addition, the present invention does not require for carrying out the two emulsification procedures successively nor simultaneously. These procedures can be performed separately as in a method which comprises preparing a membrane-emulsified W/O type emulsion, transferring this emulsion to a vessel with a stirrer, then adding an aqueous phase to the emulsion and emulsifying them by the stirrer to produce a mixed W/O type emulsion. The sequence of the emulsification procedures may be reversed, as in a method comprising preparing a stirring-emulsified W/O type emulsion, dispersing an aqueous phase into the fatty phase of the emulsion through a microporous membrane to produce a mixed W/O type emulsion. The present invention may also be implemented by a method of separately preparing two kinds of emulsion, mixing them to produce a mixed W/O type emulsion, rapidly cooling the mixed emulsion to plasticize it and kneading the plasticized emulsion.

The stable W/O type spread obtained as described above has a satisfactory stability in storage and gives a smooth taste.

Now, properties such as stability, preservativity and taste of the spread of the present invention will be described in detail by means of Tests.

TEST 1

Test for the stability of a spread produced by various emulsifying procedures.

1) Preparation of Samples

Eight kinds of emulsions were prepared by the method, conditions and in compositions as indicated in Table 1A and 1B, and were subjected to rapid cooling to 5° C. and kneading, using a rapid cooling and kneading unit (Pilot Combinator; made by Schröder, [GERMANY]), giving eight kinds of spread samples referred to them as Samples Nos. 1 to 8.

Sample No. 1: Spread sample prepared by emulsifying for 30 minutes by the conventional method with a stirrer at 360 rpm, then rapidly cooling and kneading.

Sample No. 2: Spread sample prepared by emulsifying for 60 minutes by the conventional method with a stirrer at 450 rpm, then rapidly cooling and kneading.

Sample No. 3: Spread sample prepared by emulsifying using a hydrophilic microporous membrane with an average pore diameter of 0.5 μm (hereinafter simply referred to as a "hydrophilic membrane"), then rapidly cooling and kneading.

Sample No 4: Spread sample prepared by emulsifying using a hydrophobic microporous membrane with an average pore diameter of 3.0 μm (hereinafter simply referred to as a "hydrophobic membrane"), then rapidly cooling and kneading.

Sample No. 5: Spread sample with a constant composition (same as that of the final product), prepared by mixing a stirring-emulsified emulsion (mean particle size: 19.8 μm) prepared by emulsifying with a stirrer at 360 rpm for 30 minutes and another stirring-emulsified emulsion (mean particle size: 4.7 μm) prepared by emulsifying with a stirrer at 450 rpm for 60 minutes at a ratio of 50/50, then rapidly cooling and kneading.

Sample No. 6: Spread sample prepared by dispersing a 50% of the total aqueous phase into a fatty phase through a hydrophilic membrane with an average pore diameter of 0.5 μm to prepare an emulsion, adding, in parallel with this, the remaining 50% of the aqueous phase to the fatty phase of the emulsion, stirring the mixture with a stirrer at 360 rpm to prepare a mixed emulsion, and rapidly cooling and kneading the mixed emulsion.

Sample No. 7: Spread sample prepared by the same method as in Sample No. 6 except that a hydrophobic membrane having an average pore diameter of 3.0 μm was used.

Sample No. 8: Spread sample prepared by dispersing a 50% of the total aqueous phase into a fatty phase through a hydrophilic membrane with an average pore diameter of 0.5 μm to prepare an emulsion, dispersing, in parallel with this, the remaining 50% of the aqueous phase into the fatty phase of the emulsion through a hydrophobic membrane having an average pore diameter of 7.0 μm to prepare a mixed emulsion, and rapidly cooling and kneading the mixed emulsion.

2) Experimental Methods (1) Surface condition The various spread samples ware stored at −25° C. or 5° C. for overnight immediately after the production and then allowed to stand at 25° C. for seven days. They were then evaluated in accordance with the following criteria while observing the surface conditions and the separation conditions of the aqueous phase:

A: The surface condition of the spread sample is very smooth and no separation of the aqueous phase is found.
B: The surface condition of the spread sample is smooth and separation of the aqueous phase is not observed.
C: The surface condition of the spread sample is a little rough, and water drops can sometimes be found.
D: The surface condition of the spread sample is a little rough, and water drops can always be found.
E: The surface condition of the spread sample is rough, and the separation of the aqueous phase can be found.

2. Organoleptic Tests

The various spread samples were stirred at 5° C. overnight, and subjected to organoleptic test by a panel consisting of 40 persons (20 men and 20 women), evaluated in accordance with the following criteria:
a: Very smooth
b: Smooth
c: Rough
d: Easily meltable in the mouth
e: Meltable in the mouth
f: Poorly meltable in the mouth.

3. Mean Particle Size of Emulsions

The samples were measured for particle diameter distribution with a centrifugal particle size distribution analyzer (CAPA 500 made by HORIBA Co., Ltd [JAPAN]), to determine the mean particle diameter.

4. Preservativity

The various spread samples were stored at 5° C. overnight, then observed until the growth of mold are observed on the surface of the samples under the condition at 25° C.

3) Test Results

The test results are as shown in Table 1A and 1B. The stability and taste of Samples Nos. 6, 7 and 8 are remarkably more excellent than that of Samples Nos. 1, 2 and 5. Samples Nos. 6, 7 and 8 are more excellent in stability and taste than samples Nos. 3 and 4. In addition, the preservativity of Samples Nos. 6, 7 and 8 are remarkably more excellent than that of Samples Nos. 1, 2, 3, 4 and 5. It is thus confirmed that Samples Nos. 6, 7 and 8 produced by the method of the present invention are far superior to any products ever produced. Similar results were obtained in tests carried out under different conditions with different compositions.

TEST 2

Test to determine the range of the optimum ratio of the membrane-emulsified W/O type emulsion to the mixed W/O type emulsion.

1) Preparation of Samples

Under emulsifying conditions and compositions as shown in Table 2, 20 to 95% of the total aqueous phase were dispersed into a continuously circulating fatty phase through various hydrophilic membranes. In parallel with this, the remaining aqueous phase was added to the fatty phase, and stirred with a stirrer at 360 rpm to prepared five kinds of mixed emulsions. Then the emulsions subjected to rapid cooling to 5° C. and kneaded by means of rapid cooling and kneading unit (Pilot Combinator made by Schröder, [GERMANY]), to prepare five kinds of spread Samples Nos. 9 to 13.

2) Experimental Methods

The various spread samples were tested for stability by storing them at 5° C. overnight and allowing them to stand at 25° C. for seven days, and also for their surface conditions and aqueous phase separation conditions under the same procedures as in Test 1. Moreover, they were tested for taste and preservativity under the same procedure as in Test 1.

3) Test Results

The test results are as shown in Table 2. Samples Nos. 10, 11 and 12 are more excellent in stability and taste than Samples Nos. 9 and 15, and they are remarkably more excellent in preservativity than Samples Nos. 9 and 13. These results indicate that, in the case of preparing a mixed W/O type emulsion by mixing a membrane-emulsified emulsion with an emulsion obtained by another emulsifying method, the ratio of the membrane-emulsified W/O type emulsion to the mixed W/O type emulsion (the ratio of the aqueous phase of the membrane-emulsified W/O type emulsion relative to the total aqueous phase) should be at least 30%, and particularly, within a range of from 30 to 90%.

TEST 3

Test to determine the range of optimum ratio of fatty phase relative to the final product.

1) Preparation of Samples

Four kinds of emulsions were prepared, with the use of various hydrophilic membranes and a stirrer, under the conditions and with the compositions as shown in Table 3A and 3B by the same method as in Test 2, and the thus prepared samples were rapidly cooled to 5° C., and kneaded by means of a rapid cooling and kneading unit (Pilot Combinator made by Schröder, [GERMANY]) to prepare four kinds of spread Samples Nos. 14 to 17.

2) Experimental Method

The spread samples were tested for stability and taste by the same method as in Test 2.

3) Test Results

The test results are as shown in Table 3A and 3B. The stability and taste of Samples Nos. 14, 15 and 16 are superior to that of Sample No. 17, and these results indicate that the preferred ratio of the fatty phase relative to the final product is at least 20%. With a ratio of fatty phase relative to the final product of at least 50%, it is known that a spread excellent in stability and taste is available even by the conventional method.

TEST 4

Test to determine the range of optimum ratio of stabilizers and gelling agents in aqueous phase.

1) Preparation of Samples

According to the method as described in Test 2 and conditions and compositions as shown in Table 4A and 4B, eleven kinds of emulsions were prepared, with the use of various hydrophilic membranes and a stirrer, and they were rapidly cooled to 5° C., and kneaded with a rapid cooling and kneading unit (Pilot Combinator made by Schröder, [GERMANY]) to prepare eleven kinds of spread Samples Nos. 18 to 28.

2) Experimental Method

The test was carried out on stability and taste by the same method as in Test 2.

3) Test results

The test results are as shown in Table 4A and 4B. The test results for stability and taste of Sample No. 18 and Samples Nos. 15 and 16 shown in Table 3B, which have a lower ratio of the fatty phase than in Samples Nos. 18 to 28 indicate that a stable spread excellent in taste is available even without adding any stabilizers or gelling agents in the aqueous phase.

The test results for stability and taste of Samples Nos. 19 to 23 indicate that these effects are not affected by the kind of stabilizers and gelling agents. Accordingly, in the tests designed to determine desirable ratio of stabilizers and gelling agents in the aqueous phase, casein and xanthan gum were used.

The taste of Samples Nos. 24 to 26 are superior to that of Samples Nos. 27 and 28 indicating that the desirable ratio of stabilizers and gelling agents in the aqueous phase is 15% and less. Samples Nos. 25 and 28 were tested by adding casein and xanthan gum in the same ratio. Samples prepared by the method of the present invention were tested under altered conditions, and substantially the same results as those described above were obtained.

TEST 5

Test to determine the effect of the presence of stabilizers and gelling agents in each aqueous phase in emulsions prepared by two different emulsifying methods.

1) Preparation of Samples

Twelve kinds of emulsions were prepared by the methods, conditions and compositions as shown in Table 5A and 5B and described below, and they were rapidly cooled to 5° C. and kneaded by means of a rapid cooling and kneading unit (Pilot Combinator, made by Schr/öder [GERMANY]) to prepare twelve kinds of spread Samples Nos. 29 to 40. When the aqueous phase contains stabilizers and gelling agents, they are 3% gelatine and 1% xanthan gum.

Sample No. 29: Spread sample, with a constant composition (same as that of a final product), produced by preparing a mixed W/O type emulsion and rapidly cooling and kneading the mixed emulsion, in which the mixed emulsion was prepared by mixing a stirring-emulsified emulsion (mean particle size: 19.7 μm) which was obtained by stirring aqueous phase 1, 50% of total aqueous phase having no stabilizer and gelling agent and 50% of total fatty phase by a stirrer at 360 rpm for 30 minutes, with another stirring-emulsified emulsion (mean particle size: 4.6 μm) which was separately obtained by stirring aqueous phase 2, the remaining 50% of the total aqueous phase and the remaining 50% of the fatty phase by a stirrer at 450 rpm for 60 minutes.

Sample No. 30: Spread sample prepared by the same method as in Sample No. 29 except that both the aqueous phases 1 and 2 contain a stabilizer and a gelling agent.

Sample No. 31: Spread sample prepared by the same method as in Sample No. 29 except that the aqueous phase 2 contains a stabilizer and a gelling agent.

Sample No. 32: Spread sample prepared by the same method as in Sample No. 29 except that the aqueous phase 1 contains a stabilizer and a gelling agent.

Sample No. 33: Spread sample produced by preparing a mixed W/O type emulsion and rapidly cooling and kneading the mixed emulsion, in which the mixed emulsion was prepared by stirring a fatty phase (40 weight parts) and an aqueous phase 1 (20 weight parts) containing a stabilizer and a gelling agent with a stirrer at 360 rpm for 30 minutes to obtain a stirring-emulsified emulsion (mean particle size: 19.7 μm), then adding an aqueous phase 2 (40 weight parts) not containing a stabilizer and a gelling agent to the stirring-emulsified emulsion and stirring them with a stirrer at 450 rpm for 60 minutes.

Sample No. 34: Spread sample prepared by the same method as in Sample No. 33 except that the aqueous phase 1 does not contain a stabilizer or a gelling agent and the aqueous phase 2 contains a stabilizer and a gelling agent.

Sample No. 35: Spread sample produced by preparing a mixed W/O type emulsion and rapidly cooling and kneading the mixed emulsion, in which the mixed emulsion was prepared by dispersing an aqueous phase 1, 50% of a total aqueous phase having no stabilizer and gelling agent into a fatty phase through a hydrophilic membrane with an average pore diameter of 15.0 μm to obtain an emulsion, adding, in parallel with this, an aqueous phase 2, the remaining 50% of the aqueous phase, to the fatty phase of the emulsion and stirring them by a stirrer at 360 rpm.

Sample No. 36: Spread sample prepared by the same method as in Sample No. 35 except that the aqueous phases 1 and 2 contain a stabilizer and a gelling agent.

Sample No. 37: Spread sample prepared by the same method as in Sample No. 35 except that the aqueous phase 2 contains a stabilizer and a gelling agent.

Sample No. 38: Spread sample prepared by the same method as in Sample No. 35 except that the aqueous phase 1 contains a stabilizer and a gelling agent.

Sample No. 39: Spread sample produced by preparing a mixed W/O type emulsion and rapidly cooling and kneading the mixed emulsion, in which the mixed emulsion was prepared by stirring a fatty phase (40 weight parts) and an aqueous phase 1 (20 weight parts) containing a stabilizer and a gelling agent with a stirrer at 360 rpm for 30 minutes to obtain a stirring emulsified emulsion (mean particle size: 19.7 μm), and dispersing, in parallel with this, an aqueous phase 2 (40 weight parts) not containing any stabilizer and gelling agent into the fatty phase of the emulsion through a hydrophilic membrane with an average pore diameter of 15.0 μm.

Sample No. 40: Spread sample prepared by the same method as in Sample No. 39 except that the aqueous phase 1 does not contain a stabilizer or a gelling agent and the aqueous phase 2 contains a stabilizer and a gelling agent.

2. Experimental Methods

The spread samples were tested for stability and taste by he same method as in Test 2.

3.) Test Results

The test results are as shown in Table 5A and 5B. The stability and taste of samples Nos. 35 to 40 are superior to that of Samples Nos. 29 to 34, indicating that the combination of membrane emulsification and another emulsification is excellent in the production of low-fat spread.

The test results regarding stability and taste of Samples Nos. 35 to 40 indicate that stability and taste are not seriously affected by the presence or absence of a stabilizer and a gelling agent in an aqueous phase of an emulsion prepared by the combination of membrane emulsification and another emulsification (two different methods of emulsification). In other words, these results indicate that a stable spread excellent in taste is available even without adding a stabilizer or a gelling agent to the aqueous phase (i.e., even with a null concentration of stabilizer and gelling agent in the aqueous phase) as has been described above with respect to the test results of Test 4, and that a stable spread excellent in taste is available even by adding a stabilizer and a gelling agent to the aqueous phases of both of the two kinds of emulsion produced by the combination of membrane emulsification and another method of emulsification (two different methods of emulsification) or only to one aqueous phase. Samples prepared by the method of the present invention were tested under altered conditions, and substantially the same results as those described above were obtained.

EFFECTS OF THE INVENTION

The effects achieved by the present invention are as follows:

(1) In the production of low-fat spreads (the ratio of the fatty phase relative to the final products is within a range of from 20 to 50 wt %), the present invention provides a low-fat spread with a stability and preservativity improved to a level never achieved by any of the conventional methods or the method according to the prior invention. Therefore, the low-fat spread of the present invention never reduce its value during transit processes or in any preservation conditions.

(2) A low-fat spread with a further improved taste is available.

(3) In the method of the present invention, the effects of viscous substances such as stabilizers and gelling agents and polluting substances easily absorbed on the porous membrane can be excluded by directly adding an aqueous phase to a fatty phase or combining a porous membrane having relatively large micropores and a porous membrane having smaller micropores, thus permitting reduction of the membrane emulsification time and the time for washing and regeneration of the membrane to a half or even a third of that required in the prior invention, hence improvement of productivity.

EXAMPLES

Now, the present invention will be described further in detail by means of examples. The method of the present invention is not limited to the following examples.

Example 1

One and half kilograms, respectively, of commercially available soybean oil and palm oil (both by Taiyo Fats and Oils Co. [JAPAN]) were mixed, and polyglycerin ester of condensed ricinoleic acids (by Sakamoto Pharmaceutical Industry Co.[JAPAN]) was added at a ratio of 2.0% to this mixture, and mixed uniformly to prepare a fatty phase. Salt and xanthan gum were added and dissolved at a ratio of 1.6% and 0.2%, respectively, to 9.0 kg water to prepare an aqueous phase 1. Salt, gelatin and guar gum were added at a ratio of 1.6%, 3.0% and 1.0%, respectively to 3.0 kg water to prepare an aqueous phase 2. In the process as shown in FIG. 1, the aqueous phase 1 stored in a pressure vessel (6) was supplied through a pipeline (10) to a porous membrane module (5) mounted with a hydrophilic membrane with a pore diameter of 7.8 μm (by Ise Chemical Industries Co.[JAPAN]) where the aqueous phase 1 was dispersed into a fatty phase, and the membrane-emulsified emulsion was sent back through a pipeline (11) to a circulation bath (2). In parallel with this at the same time, the aqueous phase 2 stored in a pressure vessel (6') was supplied through a pipeline (10') to the circulation bath (2), where the aqueous phase 2 was added to a fatty phase, emulsified by a stirrer (1), and mixed with the above-mentioned membrane-emulsified emulsion. The mixed emulsion was sent again to the emulsification process using the porous membrane, and then sent back to the circulation bath (2) for emulsification by the stirrer. This cycle was continued until the entire aqueous phases were emulsified into the fatty phase, thus supplying about 14.8 kg mixed W/O type emulsion. Then, the emulsion was sterilized by heating at 85° C. for ten minutes, rapidly cooled to 20° C., and kneaded by means of a rapid cooling and kneading unit (Pilot Combinator, made by Schröder, [GERMANY]) to obtain about 14.5 kg spread.

This spread was tested by the same method as in Test 1. The results indicated high stability with no separation of the aqueous phase, a smooth palatability, and excellent melting in the mouth.

Example 2

Two kilograms, respectively, of commercially available soybean oil and corn oil (both by Taiyo Fats and Oils Co. [JAPAN]) were mixed, and sucrose ester of fatty acids (by Daiichi Kogyo Pharmaceutical Co.[JAPAN]) and polyglycerin ester of condensed ricinoleic acids (by Sakamoto Pharmaceutical Industry Co.[JAPAN]) were added at a ratio of 0.5% and 1.5%, respectively, to this mixture, and mixed uniformly to prepare a fatty phase. Salt and xanthan gum were added and dissolved at a ratio of 1.5% and 0.1%, respectively, to 5.0 kg water to prepare an aqueous phase 1. Salt and casein sodium were added and dissolved at ratio of 1.5% and 3.0%, respectively, to 5.0 kg water to prepare an aqueous phase 2. In the process as shown in FIG. 2, the aqueous phase 1 stored in the pressure vessel (6) was sent through a pipeline (10) to a porous membrane module (5) provided with a hydrophilic membrane having a pore diameter of 2.2 μm (by Ise Chemical Industries Co.[JAPAN]) where the aqueous phase 1 was dispersed into a fatty phase, to prepare a membrane-emulsified emulsion. Then, this membrane-emulsified emulsion was sent through a pipeline (11) to a porous membrane module (5') provided with a hydrophobic membrane having a pore diameter of 15.0 μm (by Ise Chemical Industries Co.[JAPAN]), where the aqueous phase 2 stored in a pressure vessel (6') was dispersed into the fatty phase of the membrane-emulsified emulsion, and the mixed emulsion was sent through a pipeline (11') back to the circulation bath (2). This cycle was continued until complete emulsification of the entire aqueous phases into the fatty phase, thus obtaining about 13.8 kg mixed W/O type emulsion. Then, the emulsion was sterilized by heating at 85° C. for ten minutes, rapidly cooled to 20° C., and kneaded by means of a rapid cooling and kneading unit (Pilot Combinator, made by Schröder, [GERMANY]) to obtain about 13.5 kg spread.

This spread was tested by the same method as in Test 1. The results indicated a high stability with no separation of the aqueous phases, a smooth palatability, and excellent melting in the mouth.

Example 3

Two kilograms, respectively, of commercially available soybean oil and corn oil (both by Taiyo Fats and Oils Go. [JAPAN]) were mixed, and sucrose ester of fatty acids (by Daiichi Kogyo Pharmaceutical Co.[JAPAN]) and polyglycerin ester of condensed ricinoleic acids (by Sakamoto Pharmaceutical Industry Co.) were added at a ratio of 0.5% and 1.5%, respectively, to this mixture, and mixed uniformly to prepare a fatty phase. Salt was added and dissolved at a ratio of 1.6% to 6.0 kg water to prepare an aqueous phase. Part of the aqueous phase stored in a pressure vessel in an amount of 1.8 kg was dispersed through a hydrophilic membrane having a pore diameter of 0.5 μm (by Ise Chemical Industry Co.[JAPAN]) into a fatty phase and circulated through a circulation bath while emulsifying. In parallel with this at the same time, the remaining aqueous phase stored in the pressure vessel in an amount of 4.2 kg was added to the fatty phase in the circulation bath, emulsified by a stirrer, and mixed with the above-mentioned membrane-emulsified emulsion. This cycle of sending again this mixed emulsion to the emulsifying process using the porous membrane and then sending back to the circulation bath for stirring-emulsification was continued until complete emulsification of the entire aqueous phase into the fatty phase, thus obtaining about 9.8 kg mixed W/O type emulsion. Then, the emulsion was sterilized by heating at 85° C. for ten minutes, rapidly cooled to 20° C., and kneaded by means of a rapid cooling and kneading unit (Pilot Combinator, made by Schröder, [GERMANY]) to obtain about 9.5 kg spread.

This spread was tested by the same method as in Test 1. The results indicated high stability with no separation of the aqueous phase, a smooth palatability, and excellent melting in the mouth.

Example 4

Polyglycerin ester of condensed ricinoleic acids (by Sakamoto Pharmaceutical Industries Co.[JAPAN]) was added at a ratio of 2.0% to 4.0 kg commercially available soybean oil (by Taiyo Fats and Oils Co.[JAPAN]) and uniformly mixed to prepare a fatty phase. In contrast, salt, gelatin and xanthan gum were added and dissolved at a ratio of 1.6%, 3.0% and 1.0%, respectively, to 3.0 kg water to prepare an aqueous phase 1. Salt and xanthan gum were added and dissolved at a ratio of 1.6% and 0.2%, respectively, to 3.0 kg water to prepare an aqueous phase 2. The aqueous phase 1 was added to the fatty phase in a stirring bath and emulsified by means of a stirrer to prepare a stirring-emulsified emulsion. After the completion of stirring emulsification, the aqueous phase 2 was dispersed through a porous membrane module provided with a hydrophilic membrane having a pore diameter of 3.0 μm (by Ise Chemical Industries Co.[JAPAN]) into the fatty phase of the stirring-emulsified emulsion to obtain about 9.7 kg mixed emulsified W/O type emulsion. Then, the emulsion was sterilized by heating at 85° C. for ten minutes, rapidly cooled to 20° C., and kneaded by means of a rapid cooling and kneading unit (Pilot Combinator, made by Schröder [GERMANY]) to obtain about 9.4 kg spread.

This spread was tested by the same method as in Test 1. The results indicated a high stability with no separation of the aqueous phase, a smooth palatability, and excellent melting in the mouth.

Example 5

Sucrose ester of fatty acids (by Daiichi Pharmaceutical Co.[JAPAN]) and polyglycerin ester of condensed ricinoleic acids (by Sakamoto Pharmaceutical Co.[JAPAN]) were added at a ratio of 0.5% and 1.5%, respectively, to 7.2 kg commercially available corn oil (by Taiyo Fats and Oils Co.[JAPAN]), and uniformly mixed to prepare a fatty phase 1. A fatty phase 2 was prepared by adding polyglycerin ester of condensed ricinoleic acids (by Sakamoto Pharmaceutical Co.[JAPAN]) at a ratio of 2.0% to 0.8 kg commercially available palm oil (by Taiyo Fats and Oils Co.[JAPAN]), and uniformly mixed. In contrast, salt and xanthan gum were added and dissolved at a ratio of 1.3% and 0.2%, respectively, to 10.8 kg water to prepare an aqueous phase 1. Salt, gelatin and guar gum were added and dissolved at a ratio of 1.6%, 3.0% and 1.0%, respectively, to 1.2 kg water to prepare an aqueous phase 2. The aqueous phase 1 was dispersed into the fatty phase 1 through a porous membrane module provided with a hydrophobic membrane having a pore diameter of 3.0 μm (by Ise Chemical Industries Co.[JAPAN]) to prepare a membrane-emulsified emulsion. The aqueous phase 2 was separately added to the fatty phase 2 in a stirring bath, and the mixture was emulsified by a stirrer to prepare a stirring-emulsifiedemulsion. After the completion of these processes of emulsification, the membrane-emulsified emulsion and the stirring-emulsified emulsion were mixed to obtain about 19.7 kg mixed W/O type emulsion. Then, the emulsion was sterilized by heating at 85° C. for ten minutes, rapidly cooled to 20° C., and kneaded by means of a rapid cooling and kneading unit (Pilot Combinator, made by Schröder [GERMANY]), to obtain about 19.4 kg spread.

This spread was tested by the same method as in Test 1. The results indicated a high stability with no separation of the aqueous phase, a smooth palatability, and excellent melting in the mouth.

TABLE 1A

| Division | Sample No. | Method of emulsification | Mean particle diameter of emulsion (μm) | Emulsified composition (%) Fatty phase [Note 1] | Aqueous phase [Note 2] |
|---|---|---|---|---|---|
| Conventional Method | 1 | Stirrier (360 rpm, 30 min.) | 20.7 | Soybean oil 25 | Water 75 |
|  | 2 | Stirrer (450 rpm, 60 min.) | 5.1 | " | " |
| Prior invention | 3 | Hydrophilic membrane (pore dia.: 0.5 μm) | 6.5 | " | " |
|  | 4 | Hydrophobic membrane (pore dia.: 3.0 μm) | 8.4 | " | " |
| Control | 5 | Stirrer(360 rpm, 30 min.) + stirrer(450 rpm, 60 min.) | 12.3 | " | " |
| Present invention | 6 | Hydrophilic membrane (pore dia.: 0.5 μm) + stirrer (360 rpm) | 10.3 | " | " |

TABLE 1A-continued

| Division | Sample No. | Method of emulsification | Mean particle diameter of emulsion (μm) | Emulsified composition (%) Fatty phase [Note 1] | Aqueous phase [Note 2] |
|---|---|---|---|---|---|
| | 7 | [50%] [Note 5] Hydrophobic membrane (pore dia.: 3.0 μm) + stirrer (360 rpm) [50%] | 15.5 | " | " |
| | 8 | Hydrophilic membrane (pore dia.: 0.5 μm) + hydrophobic membrane (pore dia.: 7.0 μm) | 13.8 | " | " |

Note 1: Contains 2.0 polyglycerin ester of condensed ricinoleic acids and 0.01% β-carotene in the fatty phase.
Note 2: Contains 1.5% salt in the aqueous phase.
Note 5: Ratio of membrane-emulsified W/O type emulsion to mixed W/O type emulsion.

TABLE 1B

| Sample No. | Stability of spread Immediately after production | −25° C. to 25° C. [Note 3] | 5° C. to 25° C. [Note 4] | Taste | Preservativity (days) |
|---|---|---|---|---|---|
| 1 | C | E | D | c, f | 10 |
| 2 | B | D | d | c, f | 10 |
| 3 | B | C | B | b, e | 30 |
| 4 | B | C | B | b, e | 30 |
| 5 | B | D | C | c, f | 15 |
| 6 | A | B | A | a, d | 50 |
| 7 | A | B | A | a, d | 50 |
| 8 | A | B | A | a, d | 50 |

Note 3: Means that the sample has been stored at −25° C. overnight after the production, and has been allowed to stand at 25° C. for the subsequent seven days.
Note 4: Means that the sample has been stored at 5° C. overnight after the production, and has been allowed to stand at 25° C. for the subsequent seven days.

TABLE 2

| Sample No. | Method of emulsification | Ratio of membrane emulsified emulsion(%) [Note 1] | Emulsified composition Fatty phase [Note 2] | Aqueous phase [Note 3] | Stability of spread | taste | Preservativity (days) |
|---|---|---|---|---|---|---|---|
| 9 | Hydrophilic membrane (pore dia.; 0.5 μm) + stirrer (360 rpm) | 20 | Soybean oil 25 | Water 75 | C | c, f | 20 |
| 10 | Hydrophilic membrane (pore dia.; 0.5 μm) + stirrer (360 rpm) | 30 | " | " | A | a, d | 50 |
| 11 | Hydrophilic membrane (pore dia.; 0.5 μm) + stirrer (360 rpm) | 50 | " | " | A | a, d | 50 |
| 12 | Hydrophilic membrane (pore dia.; 0.5 μm) + stirrer (360 rpm) | 90 | " | " | A | a, d | 45 |
| 14 | Hydrophilic membrane (pore dia.; 0.5 μm) + stirrer (360 rpm) | 95 | " | " | B | b, e | 35 |

Note 1: Ratio of membrane-emulsified W/O type emulsion to mixed W/O type emulsion.
Note 2: Contains 2.0% polyglycerin ester of condensed ricinoleic acids and 0.01% β-carotene in the fatty phase.
Note 3: Contains 1.5% salt in the aqueous phase.

TABLE 3A

| Sample No. | Method of emulsification | Membrane-emulsifying pressure (kg/cm²) | Ratio of membrane-mulsified emulsion (%) [Note 1] |
|---|---|---|---|
| 14 | Hydrophilic membrane (pore dia.: 0.5 μm) + stirrer (360 rpm) | 0.005 | 30 |
| 15 | Hydrophilic membrane (pore dia.: 0.5 μm) + stirrer (360 rpm) | 0.005 | 30 |
| 16 | Hydrophilic membrane (pore dia.: 0.5 μm) + stirrer (360 rpm) | 0.005 | 90 |
| 17 | Hydrophilic membrane (pore dia.: 0.5 μm) + stirrer (360 rpm) | 0.005 | 30 |

Note 1: Ratio of membrane-emulsified W/O type emulsion to mixed W/O type emulsion.

TABLE 3B

| Sample No. | Emulsified composition (%) Fatty phase [Note 2] | Aqueous phase [Note 3] | Concentration of stabilizer and gelling agent in the aqueous phase (%) | Stability of spread | Taste |
|---|---|---|---|---|---|
| 14 | Soybean oil 25 Corn oil 25 | Water 50 | 0 | A | a, d |
| 15 | Soybean oil 10 Corn oil 10 | Water 80 | 0 | A | a, d |
| 16 | Soybean oil 10 Corn oil 10 | Water 80 | 0 | A | a, d |
| 17 | Soybean oil 7.5 Corn oil | Water 85 | 0 | C | c, f |

TABLE 3B-continued

| Sample No. | Emulsified composition (%) Fatty phase [Note 2] | Emulsified composition (%) Aqueous phase [Note 3] | Concentration of stabilizer and gelling agent in the aqueous phase (%) | Stability of spread | Taste |
|---|---|---|---|---|---|
| | | | 7.5 | | |

Note 2: Contains 2.0% polyglycerin ester of condensed ricinoleic acids and 0.01% β-carotene in the fatty phase.
Note 3: Contains 1.5% salt in the aqueous phase.

TABLE 4A

| Sample No. | Method of emulsification | Membrane emulsifying pressure (kg/cm$^2$) | Ratio of membrane-mulsified emulsion (%) [Note 1] |
|---|---|---|---|
| 18 | Hydrophilic membrane (pore dia.: 15.0 μm) + stirrer (360 rpm) | 30.0 | 50 |
| 19 | Hydrophilic membrane (pore dia.: 15.0 μm) + stirrer (360 rpm) | 30.0 | 50 |
| 20 | Hydrophilic membrane (pore dia.: 15.0 μm) + stirrer (360 rpm) | 30.0 | 50 |
| 21 | Hydrophilic membrane (pore dia.: 15.0 μm) + stirrer (360 rpm) | 30.0 | 50 |
| 22 | Hydrophilic membrane (pore dia.: 15.0 μm) + stirrer (360 rpm) | 30.0 | 50 |
| 23 | Hydrophilic membrane (pore dia.: 15.0 μm) + stirrer (360 rpm) | 30.0 | 50 |
| 24 | Hydrophilic membrane (pore dia.: 15.0 μm) + stirrer (360 rpm) | 30.0 | 50 |
| 25 | Hydrophilic membrane (pore dia.: 15.0 μm) + stirrer (360 rpm) | 30.0 | 50 |
| 26 | Hydrophilic membrane (pore dia.: 15.0 μm) + stirrer (360 rpm) | 30.0 | 50 |
| 27 | Hydrophilic membrane (pore dia.: 15.0 μm) + stirrer (360 rpm) | 30.0 | 50 |
| 28 | Hydrophilic membrane (pore dia.: 15.0 μm) + stirrer (360 rpm) | 30.0 | 50 |

Note 1: Ratio of membrane-emulsified W/O type emulsion to mixed W/O type emulsion.

TABLE 4B

| Sample No. | Emulsified composition (%) Fatty phase [Note 2] | Emulsified composition (%) Aqueous phase [Note 3] | Concentration of stabilizer and gelling agent in the aqueous phase [Note 4] | Stability of spread | Taste |
|---|---|---|---|---|---|
| 18 | Soybean oil 20 Corn oil 20 | Water 60 | 0 | A | a, d |
| 19 | Soybean oil 20 Corn oil 20 | Water 60 | Ge 3, G 1 | A | a, d |
| 20 | Soybean oil 20 Corn oil 20 | Water 60 | Ge 3, X 1 | A | a, d |
| 21 | Soybean oil 20 Corn oil 20 | Water 60 | Ca 3, G 1 | A | a, d |
| 22 | Soybean oil 20 Corn oil 20 | Water 60 | Ca 3, X 1 | A | a, d |
| 23 | Soybean oil 20 Corn oil 20 | Water 60 | Ge 1.5, Ca 1.5 G 0.5, X 0.5 | A | a, d |
| 24 | Soybean oil 20 Corn oil 20 | Water 60 | Ca 15 | A | a, d |
| 25 | Soybean oil 20 Corn oil 20 | Water 60 | Ca 14, X 1.0 | A | a, d |
| 26 | Soybean oil 20 Corn oil 20 | Water 60 | Ca 13, X 2.0 | A | a, d |
| 27 | Soybean oil 20 Corn oil 20 | Water 60 | Ca 20.0 | A | c, f |
| 28 | Soybean oil 20 Corn oil 20 | Water 60 | Ca 18.7, X 1.3 | A | c, f |

Note 2: Contains 2.0% polyglycerin ester of condensed ricinoleic acids and 0.01% β-carotene in the fatty phase.
Note 3: Contains 1.5% salt in the aqueous phase.
Note 4: Ge means gelatin; Ca, casein; G, guar gum; and X, xanthan gum, respectively.

TABLE 5A

| Sample No. | Method of emulsification | Membrane-emulsifying pressure (kg/cm$^2$) | Ratio of membrane-mulsified emulsion (%) [Note 1] |
|---|---|---|---|
| 29 | Stirrer (360 rpm, 30 min) + stirrer (450 rpm, 60 min) | — | — |
| 30 | Stirrer (360 rpm, 30 min) + stirrer (450 rpm, 60 min) | — | — |
| 31 | Stirrer (360 rpm, 30 min) + stirrer (450 rpm, 60 min) | — | — |
| 32 | Stirrer (360 rpm, 30 min) + stirrer (450 rpm, 60 min) | — | — |
| 33 | Stirrer (360 rpm, 30 min) + stirrer (450 rpm, 60 min) in succession | — | — |
| 34 | Stirrer (360 rpm, 30 min) + stirrer (450 rpm, 60 min) in succession | — | — |
| 35 | Hydrophilic membrane (pore dia.: 15.0 μm) + stirrer (360 rpm) | 30.0 | 50 |
| 36 | Hydrophilic membrane (pore dia.: 15.0 μm) + stirrer (360 rpm) | 30.0 | 50 |
| 37 | Hydrophilic membrane (pore dia.: 15.0 μm) + stirrer (360 rpm) | 30.0 | 50 |
| 38 | Hydrophilic membrane (pore dia.: 15.0 μm) + stirrer (360 rpm) | 30.0 | 50 |
| 39 | Stirrer (360 rpm, 30 min) + hydrohilic membrane (pore dia.: 15.0 μm) | 30.0 | 67 |
| 40 | Stirrer (360 rpm, 30 min) + hydrohilic membrane (pore dia.: 15.0 μm) | 30.0 | 67 |

Note 1: Ratio of membrane-emulsified W/O type emulsion to mixed W/O type emulsion.

TABLE 5B

| Sample No. | Emulsified composition (%) Fatty phase [Note 2&3] | Emulsified composition (%) Aqueous phase [Note 4&5] | Presence of stabilizer and gelling agent in each aqueous phase Aqueous 1 | Presence of stabilizer and gelling agent in each aqueous phase Aqueous 2 | Stability of spread | Taste |
| --- | --- | --- | --- | --- | --- | --- |
| 29 | Corn oil 40 | Water 60 | Absent | Absent | C | c, f |
| 30 | " | " | Present | Present | B | c, f |
| 31 | " | " | Absent | Present | C | c, f |
| 32 | " | " | Present | Absent | B | c, f |
| 33 | " | " | Present | Absent | B | c, f |
| 34 | " | " | Absent | Present | C | c, f |
| 35 | " | " | Absent | Absent | A | a, d |
| 36 | " | " | Present | Present | A | a, d |
| 37 | " | " | Absent | Present | A | a, d |
| 38 | " | " | Present | Absent | A | a, d |
| 39 | " | " | Present | Absent | A | a, d |
| 40 | " | " | Absent | Present | A | a, d |

Note 2: Contains 2.0% polyglycerin ester of condensed ricinoleic acids and 0.01% β-carotene in the fatty phase.
Note 3: Ratio of fatty phase in the final product.
Note 4: Ratio of aqueous phase in the final product, the aqueous phase comprising aqueous phase 1 and aqueous phase 2.
Note 5: Contains 1.5% salt in the aqueous phase.

What is claimed is:

1. A method for production of a spread, which comprises the steps of:
   (a) preparing a water-in-oil emulsion having a first aqueous phase and a second aqueous phase in a fatty phase, wherein the first aqueous phase has a first particle size and the second aqueous phase has a second particle size different from the first particle size, by dispersing the first aqueous phase into the fatty phase through a microporous membrane to produce a water-in-oil emulsion, adding the second aqueous phase into the fatty phase of the water-in-oil emulsion, and emulsifying them;
   (b) rapidly cooling the emulsion to plasticize it; and
   (c) kneading the plasticized emulsion to obtain a water-in-oil spread.

2. The method according to claim 1, wherein the second aqueous phase and the fatty phase of the water-in-oil emulsion are emulsified by a stirrer.

3. A method for production of a spread, which comprises the steps of:
   (a) preparing a water-in-oil emulsion having a first aqueous phase and a second aqueous phase in a fatty phase, wherein the first aqueous phase has a first particle size and the second aqueous phase has a second particle size different from the first particle size, by adding the first aqueous phase into the fatty phase and emulsifying them to produce a water-in-oil emulsion, and dispersing the second aqueous phase into the fatty phase of the water-in-oil emulsion through a microporous membrane;
   (b) rapidly cooling the emulsion to plasticize it; and
   (c) kneading the plasticized emulsion to obtain a water-in-oil spread.

4. The method according to claim 3, wherein the first aqueous phase and the fatty phase are emulsified by a stirrer.

5. A method for production of a spread, which comprises the steps of:
   (a) preparing a water-in-oil emulsion having a first aqueous phase and a second aqueous phase in a fatty phase, wherein the first aqueous phase has a first particle size and the second aqueous phase has a second particle size different from the first particle size, by dispersing the first aqueous phase into the fatty phase through a microporous membrane to produce a water-in-oil emulsion and dispersing the second aqueous phase into the fatty phase of the water-in-oil emulsion through a microporous membrane having a pore diameter different from that of said membrane;
   (b) rapidly cooling the emulsion to plasticize it; and
   (c) kneading the plasticized emulsion to obtain a water-in-oil spread.

6. A method for production of a spread, which comprises the steps of:
   (a) preparing a water-in-oil emulsion having a first aqueous phase and a second aqueous phase in a fatty phase, wherein the first aqueous phase has a first particle size and the second aqueous phase has a second particle size different from the first particle size, by dispersing the first aqueous phase into a first portion of the fatty phase to produce a first water-in-oil emulsion, separately dispersing the second aqueous phase into a second portion of the fatty phase to produce a second water-in-oil emulsion, at least one of the first and the second water-in-oil emulsions being produced through a microporous membrane, and mixing the first and the second water-in-oil emulsions;
   (b) rapidly cooling the emulsion to plasticize it; and
   (c) kneading the plasticized emulsion to obtain a water-in-oil spread.

7. The method according to claim 6, wherein the first and the second water-in-oil emulsions are mixed by a stirrer.

8. A method for production of a spread, which comprises the steps of:
   (a) preparing a water-in-oil emulsion having a first aqueous phase and a second aqueous phase in a fatty phase, wherein the first aqueous phase has a first particle size and the second aqueous phase has a second particle size different from the first particle size, by adding the first aqueous phase into the fatty phase which is continuously circulating and emulsifying them, while dispersing the second aqueous phase into the fatty phase through a microporous membrane;
   (b) rapidly cooling the emulsion to plasticize it; and
   (c) kneading the plasticized emulsion to obtain a water-in-oil spread.

9. The method according to claim 8, wherein the first aqueous phase and the fatty phase which is continuously circulating are continuously emulsified by a stirrer.

* * * * *